(12) United States Patent
Nelson et al.

(10) Patent No.: US 11,794,765 B2
(45) Date of Patent: Oct. 24, 2023

(54) SYSTEMS AND METHODS TO COMPUTE A VEHICLE DYNAMIC POSE FOR AUGMENTED REALITY TRACKING

(71) Applicant: Ford Global Technologies, LLC, Dearborn, MI (US)

(72) Inventors: Tom Nelson, Plymouth, MI (US); Hemanth Yadav Aradhyula, Farmington Hills, MI (US); Erick Michael Lavoie, Van Buren Charter Township, MI (US); Ryan Joseph Gorski, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 17/411,987

(22) Filed: Aug. 25, 2021

(65) Prior Publication Data

US 2023/0065190 A1 Mar. 2, 2023

(51) Int. Cl.
*B60W 50/14* (2020.01)
*G06T 11/00* (2006.01)
(Continued)

(52) U.S. Cl.
CPC ............ *B60W 50/14* (2013.01); *B60W 30/06* (2013.01); *B60W 40/02* (2013.01); *G06T 11/00* (2013.01);
(Continued)

(58) Field of Classification Search
CPC ...... B60W 50/14; B60W 30/06; B60W 40/02; B60W 2556/45; B60W 2050/146;
(Continued)

(56) References Cited

U.S. PATENT DOCUMENTS 9,536,353 B2    1/2017  Alaniz et al.
2012/0262580 A1* 10/2012  Huebner ................ G08G 1/168
                                                    348/148
(Continued)

FOREIGN PATENT DOCUMENTS

EP           2196961 A1 *  6/2010  ........... G07C 5/0825

OTHER PUBLICATIONS

Lotfi Abdi et al, "In-Vehicle Augmented Reality Traffic Information System: A New Type of Communication Between Driver and Vehicle", Procedia Computer Science 73, published by Elsevier, 2015, 8 pages.

*Primary Examiner* — Terrell M Robinson
(74) *Attorney, Agent, or Firm* — Frank Lollo; Eversheds Sutherland (US) LLP

(57) ABSTRACT

The disclosure is generally directed to systems and methods for receiving proximity characteristics at a nomadic device, the proximity characteristics including mapped obstruction data identifying locations of one or more obstructions of an area surrounding a vehicle; calculating at last one unobstructed pose orientations for establishing a secure connection between the nomadic device and the vehicle based on the proximity characteristics, the unobstructed pose orientation determined at least in part on the mapped obstruction data; and displaying the unobstructed pose orientation on the nomadic device within an array of augmented reality pose orientations on the nomadic device. In some embodiments, the systems and methods include displaying an interactive overlay as a direction to a user of the nomadic device, the interactive overlay coaching the user to locate to the at least one unobstructive pose orientation.

17 Claims, 6 Drawing Sheets

(51) Int. Cl.
  *G06T 13/00* (2011.01)
  *H04W 76/10* (2018.01)
  *B60W 30/06* (2006.01)
  *B60W 40/02* (2006.01)
  *H04W 4/02* (2018.01)

(52) U.S. Cl.
  CPC ............ *G06T 13/00* (2013.01); *H04W 4/023* (2013.01); *H04W 76/10* (2018.02); *B60W 2050/146* (2013.01); *B60W 2420/52* (2013.01); *B60W 2556/45* (2020.02)

(58) Field of Classification Search
  CPC . B60W 2420/52; H04W 76/10; H04W 4/023; G06T 11/00; G06T 13/80
  See application file for complete search history.

(56) References Cited

U.S. PATENT DOCUMENTS

| | | | |
|---|---|---|---|
| 2013/0249942 A1 | 9/2013 | Green et al. | |
| 2013/0335301 A1* | 12/2013 | Wong | G06V 20/10 345/8 |
| 2014/0188348 A1* | 7/2014 | Gautama | B60W 10/30 701/48 |
| 2014/0200863 A1* | 7/2014 | Kamat | E02F 9/245 703/1 |
| 2015/0175068 A1 | 6/2015 | Szostak et al. | |
| 2015/0379873 A1* | 12/2015 | Tippelhofer | G08G 1/143 340/932.2 |
| 2019/0202446 A1* | 7/2019 | Golgiri | H04W 4/40 |
| 2021/0064877 A1 | 3/2021 | Ramasamy et al. | |

* cited by examiner

SYSTEMS AND METHODS TO COMPUTE A VEHICLE DYNAMIC POSE FOR AUGMENTED REALITY TRACKING

FIELD OF THE DISCLOSURE

This disclosure generally relates to vehicles, and more particularly relates to systems and methods to compute a vehicle dynamic pose for augmented reality tracking.

BACKGROUND

Despite significant developmental efforts in vehicle automation, many vehicles still require a certain level of human participation to carry out operations that are not fully autonomous. For example, a parking operation performed by a vehicle that is partially autonomous may necessitate certain actions to be carried out by an individual who is standing on a curb or roadside and remotely controlling the movements of the vehicle via a nomadic device.

Before a nomadic device can remotely control a vehicle, the nomadic device must be initialized or authenticated and coupled to the vehicle. The authentication enables operational features from a nomadic device, and the corresponding operating systems to send commands that are executed by the vehicle. Authentication is necessary to allow a nomadic device to control a vehicle. Government rules dictate that such authentication include input from a nearby user to authorize remote control of a vehicle and enables user control to be handed off from vehicle input to nomadic device input. Before such authentication can occur, the nomadic device must perform a handshake operation with the vehicle informing the vehicle that the nomadic device is nearby and prepared for user engagement.

It is desirable to provide solutions that address the ease of authentication for nomadic devices to remotely control a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
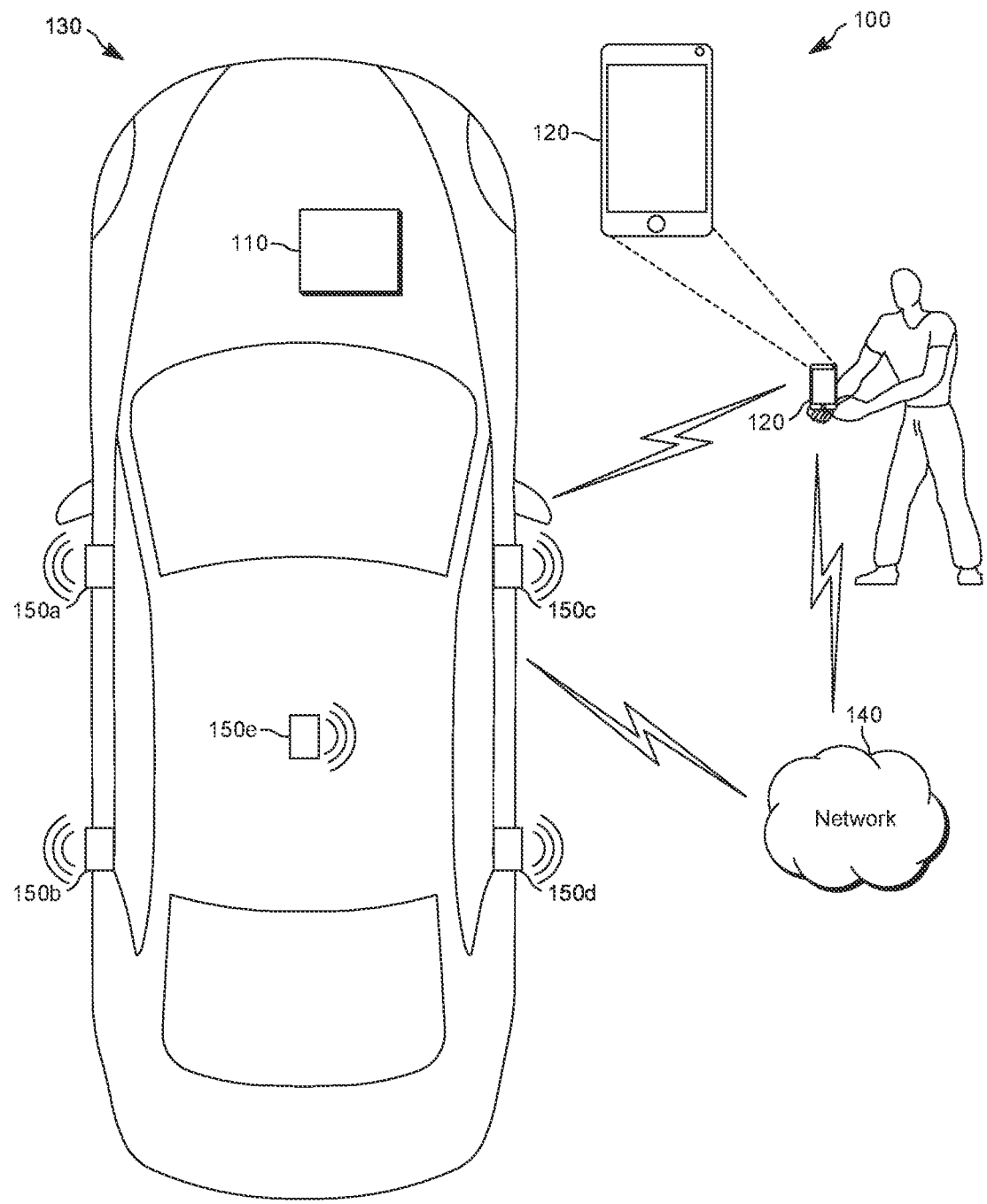
FIG. 1 illustrates an example system that includes a nomadic device configured to receive a vehicle dynamic pose to enable augmented reality tracking in accordance with and embodiment of the disclosure.

In terms of a general overview, this disclosure is generally directed to systems and methods for authorization between a vehicle and a nomadic device to enable user control of a vehicle by matching a pose. An example method includes receiving proximity characteristics at a nomadic device, the proximity characteristics including mapped obstruction data identifying possible locations of one or more obstructions of an area surrounding a vehicle. The method further includes calculating at least one unobstructed pose orientation for establishing a secure connection between the nomadic device and the vehicle based on the proximity characteristics. The method further includes displaying the unobstructed pose orientation on the nomadic device within an array of augmented reality pose orientations on the nomadic device.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

FIG. 1 illustrates an example system 100 that includes a nomadic device 120 configured to transmit remote control commands to a vehicle 130 in accordance with an embodiment of the disclosure. The vehicle 130 may be one of various types of vehicles such as a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 130, some components that may be carried out by a user of nomadic device 120, and, in some embodiments, other components that are accessible via a communications network 140. The components that can be a part of the vehicle 130 can include a vehicle computer 110, and a wireless communication system in communication with the vehicle computer 110. Nomadic device 120 may include a smartphone, a display key fob, a tablet computer, such as an iPad®, or can include a headset capable of augmented reality display or the like.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.).

The vehicle computer 110, in one or more embodiments, may be used to support features such as passive keyless operations, remotely-controlled vehicle maneuvering operations, and remote vehicle monitoring operations. Vehicle computer 110, in one or more embodiments, may execute certain operations associated with remotely-controlled vehicle maneuvering and/or remote vehicle monitoring in accordance with the disclosure.

The wireless communication system may include a set of wireless communication nodes and/or sensors 150a, 150b, 150c, 150d and 150e mounted upon vehicle 130 in a manner that allows the vehicle computer 110 to communicate with devices such as the nomadic device 120. Examples of wireless communication nodes 150a, 150b, 150c and 150e may include sensors and/or emitters capable of detecting objects, distances such as ultrasonic radar, LiDAR, cameras, and the like. In one or more embodiments, wireless communications nodes 150a, 150b, 150c, 150d and 150d may further include one or more of Bluetooth®, or Bluetooth® low energy (BLE) sensors. Further, in one or more embodiments, wireless communication node data may be enhanced or substituted with cloud-based network data communicated to vehicle 130. In an alternative implementation, a single wireless communication node and/or sensor 150e may be mounted upon the roof of the vehicle 130. The wireless communication system may use one or more of various wireless technologies such as Bluetooth®, Ultra-Wideband (UWB), Wi-Fi, ZigBee®, Li-Fi (light-based communication), audible communication, ultrasonic communication, near-field-communications (NFC), Bluetooth® low energy (BLE) and the like, for carrying out wireless communications with devices such as the nomadic device 120.

The vehicle computer 110, and the nomadic device 120 may connect via the communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, cellular, near-field communication (NFC), Wi-Fi, Wi-Fi direct, Li-Fi, acoustic or ultrasonic audio communication, Ultra-Wideband (UWB), machine-to-machine communication, and/or man-to-machine communication.

In one or more embodiments, communications network 140 includes a cellular or Wi-Fi communication link enabling the nomadic device 120 to communicate with network 140, which may include a cloud-based network or source for transferring data in accordance with this disclosure.

A software application may be provided in the nomadic device 120, which allows a user to use the nomadic device 120 for performing remote-control operations such as, for example, locking and unlocking of the doors of the vehicle 130, and for monitoring some actions performed autonomously by the vehicle 130. One example of an action performed autonomously or semi-autonomously by the vehicle 130 is a self-parking operation. The nomadic device 120 may communicate with the vehicle computer 110 via one or more of the first set of wireless communication nodes 150a, 150b, 150c, 150d and 150e perform a self-parking operation. For example, nomadic device 120 may transmit remote-control commands to control some maneuvers performed by the vehicle 130 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation).

In an example self-parking procedure, a user who may be driving the vehicle 130, gets out of the vehicle 130 and uses the nomadic device 120, which may be an iPhone®, a handheld device, or a wearable, such as a headset or other hands-free device capable of being used, for example, to remotely initiate an autonomous parking procedure of the vehicle 130. During the autonomous parking procedure, the vehicle 130 moves autonomously to park itself at a parking spot located near the user. In another case, the vehicle 130 can be a L2 level vehicle that performs a parking maneuver without human assistance. The user remains in contact with nomadic device 130 and monitors the movement of the vehicle 130 during the parking maneuver to replicate the similar oversight the individual provides when manually driving. In one or more embodiments, the user interacts with vehicle 130 using augmented reality tracking. Prior to enabling augmented reality tracking of a vehicle, embodiments provide for enabling secure authentication of a nomadic device to vehicle 130 for augmented reality tracking of vehicle 130.

In the example procedure provided above, the nomadic device 120 includes software and hardware that enables an authorization operation to take place prior to enabling the nomadic device 120 to remotely control vehicle 130 or perform augmented reality tracking. One or more embodiments include matching a vehicle pose shown on nomadic device 120 to a live view shown on the nomadic device 120.

Figure 2:
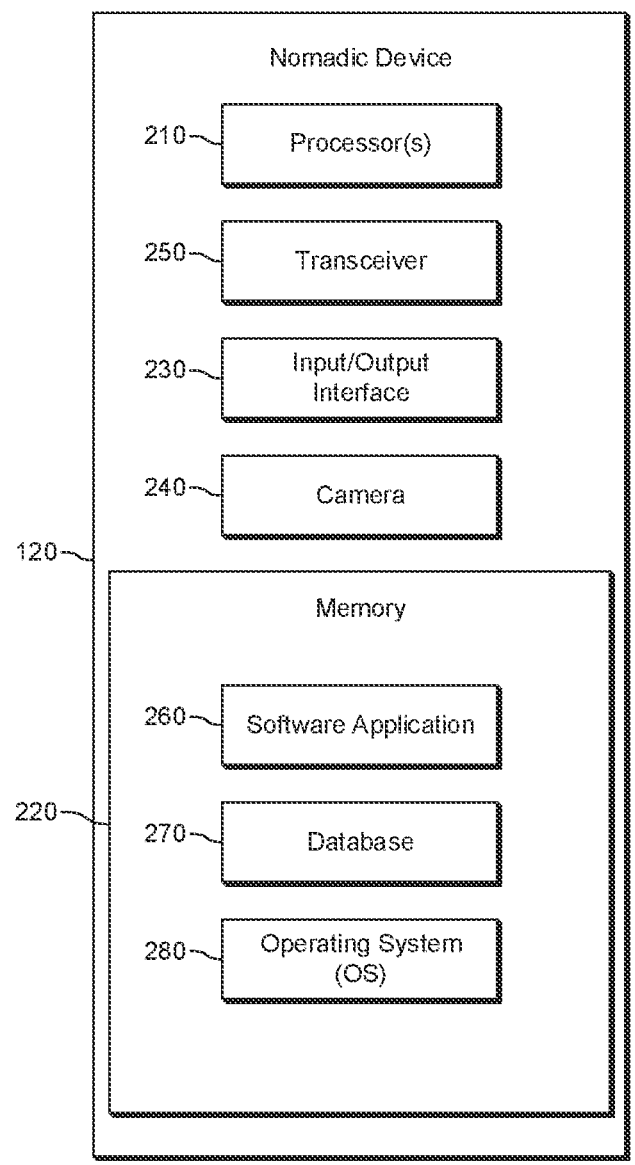
FIG. 2 illustrates some example functional blocks that may be included in a nomadic device in accordance with an embodiment of the disclosure.

FIG. 2 illustrates some example functional blocks that may be included in the nomadic device 120 in accordance with an embodiment of the disclosure. The functional blocks of the nomadic device 120 may include a processor 210, memory 220, an input/output (I/O) interface 230, camera 240, which may be a stereo camera to enable an overlay display, transceiver 250, software application 260, database 270, and an operating system (OS) 280. The I/O interface 230, may include a touchscreen having softkeys (graphical icons), and a biometric component (to enable facial recognition, a fingerprint scanner, or a microphone for voice command input). Some of these components may perform functions that are integral to the nomadic device 120, such as, for example, handling phone calls and running software applications downloaded from the Google Play store. The operating system 280 can be any of various kinds of software used for operating the nomadic device 120 such as, for example, an iOS® operating system, an Android® operating system, or a Windows® operating system.

The software application 260 may be a software application that is downloaded into the nomadic device 120 from an app store. In one or more embodiments, the software application 260 is an augmented reality software application that enables remote control of a vehicle. One example of a remote-control software application is FordPass™. The remote-control software application may be used to carry out various remote-control operations such as, for example, a vehicle self-parking operation, a trailer-hitch assist operation, and/or a trailer maneuvering assist operation.

In one or more embodiments, software application 260 operates to carry out various actions for authorizing the nomadic device 120 to a vehicle.

The transceiver 250 can include a wireless transmitter and/or a wireless receiver that is used to communicate with a transceiver in the vehicle 130. The communications may be carried out by using any of various wireless formats such as, for example, Bluetooth®, Ultra-Wideband (UWB), Wi-Fi, ZigBee®, Li-Fi (light-based communication), audible communication, and ultrasonic communication. The transceiver 250 may be coupled to various components in the vehicle 130, such as, for example, a system for in-vehicle communications (displaying messages, providing warnings, etc.) and in some embodiments also be coupled to wireless communication nodes 150a, 150b, 150c, 150d and 150e for detecting objects or obstructions outside vehicle 130. In one or more embodiments, wireless communication nodes detect obstructions and map the obstructions in a 360 degree mapping, such as, for example, a computer-aided design (CAD) file for transmission to transceiver 250. In one or more embodiments, the CAD file may instead or in addition include a series of data packets containing a data structure representing a 360 degree map. In addition, the CAD file may also be formed as a stream of data packets to be spooled into a CAD data file. As one of ordinary skill in the art will appreciate with the benefit of the present disclosure, a file sent wirelessly may be a compressed data file or other type of data formation appropriate for different wireless protocols used for transmission as necessary for system requirements. As used herein, the term "file" includes without limitation a series of data packets capable of forming a mapping of obstructions.

The computer 110 in the vehicle 130 may be configured to operate in cooperation with the software application 260 in nomadic device 120 to execute various operations associated with authenticating the nomadic device 120 to vehicle 130 by transmitting vehicle 130 information about obstructions surrounding vehicle 130 in accordance with one or more embodiments.

The memory 220, which is one example of a non-transitory computer-readable medium, may be used to store the operating system (OS) 280, database 270, and various modules such as the software application 260. One or more modules in the form of computer-executable instructions may be executed by the processor 210 for performing various operations in accordance with the disclosure. More particularly, software application 260 may be executed by the processor 210 for authenticating nomadic device to vehicle 130 to enable augmented reality tracking for carrying out various operations upon the vehicle 130 (self-parking operation, trailer-hitch assist operation, trailer maneuvering assist operation, etc.). The software application 260, in one or more embodiments, may be executed for performing augmented reality procedures and visually illustrating poses on the nomadic device 120 in accordance with the disclosure.

Figure 3:
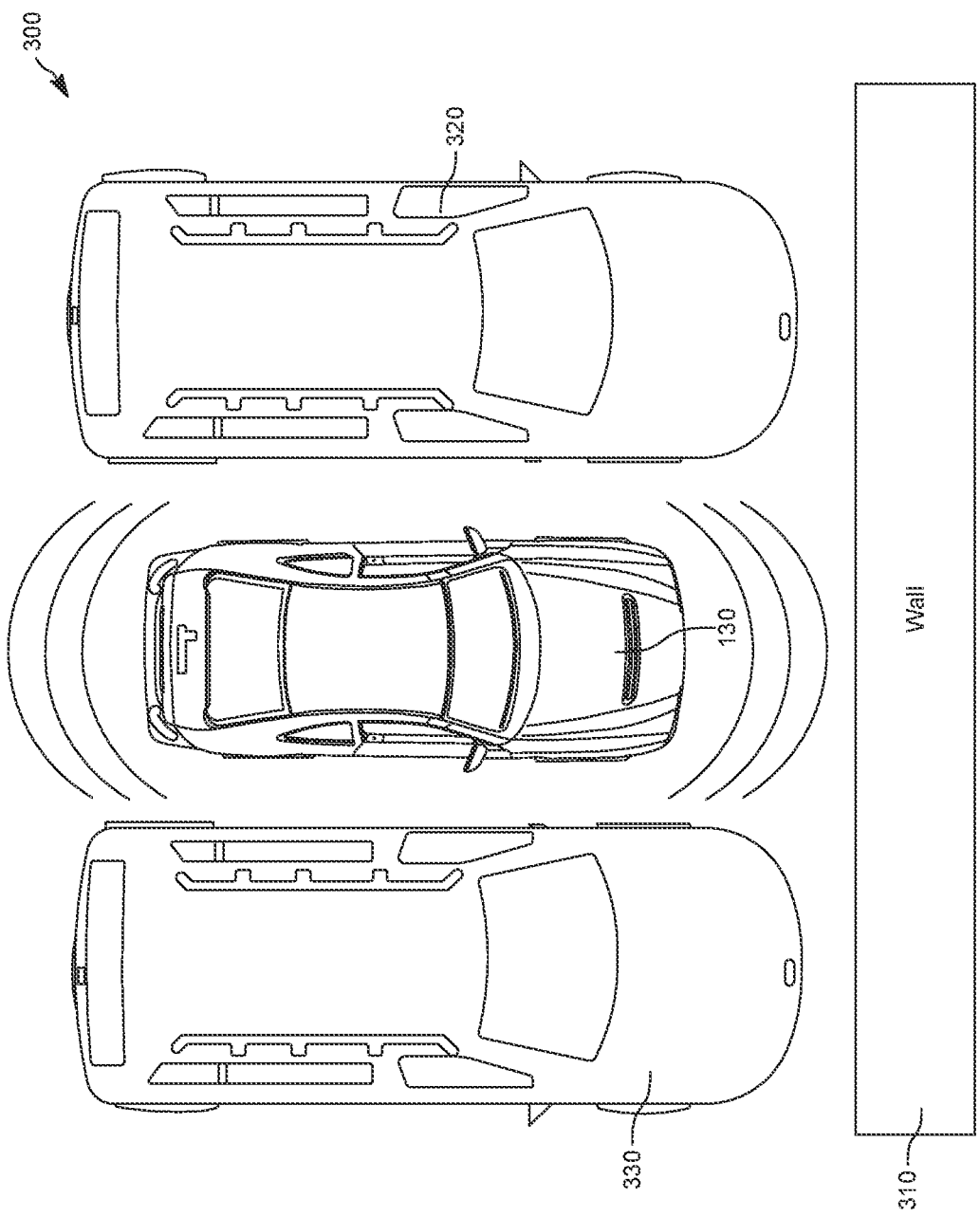
FIG. 3 illustrates a scenario of an obstructed vehicle in accordance with an embodiment of the disclosure.

FIG. 3 illustrates a scenario involving a partially obstructed vehicle appropriate for one or more embodiments in accordance with the disclosure. As shown in FIG. 3, a partially obstructed vehicle 130 is bound by a wall 310, vehicle 320 and vehicle 330. Before a user of a nomadic device can use augmented reality tracking to interact with the vehicle 130, a user must stand within an area that allows a pose of the vehicle to match a view of a camera held by the user to ensure that the user is in a predetermined vicinity to vehicle 130 in accordance with one or more levels of remote control interaction rules.

Figure 4:
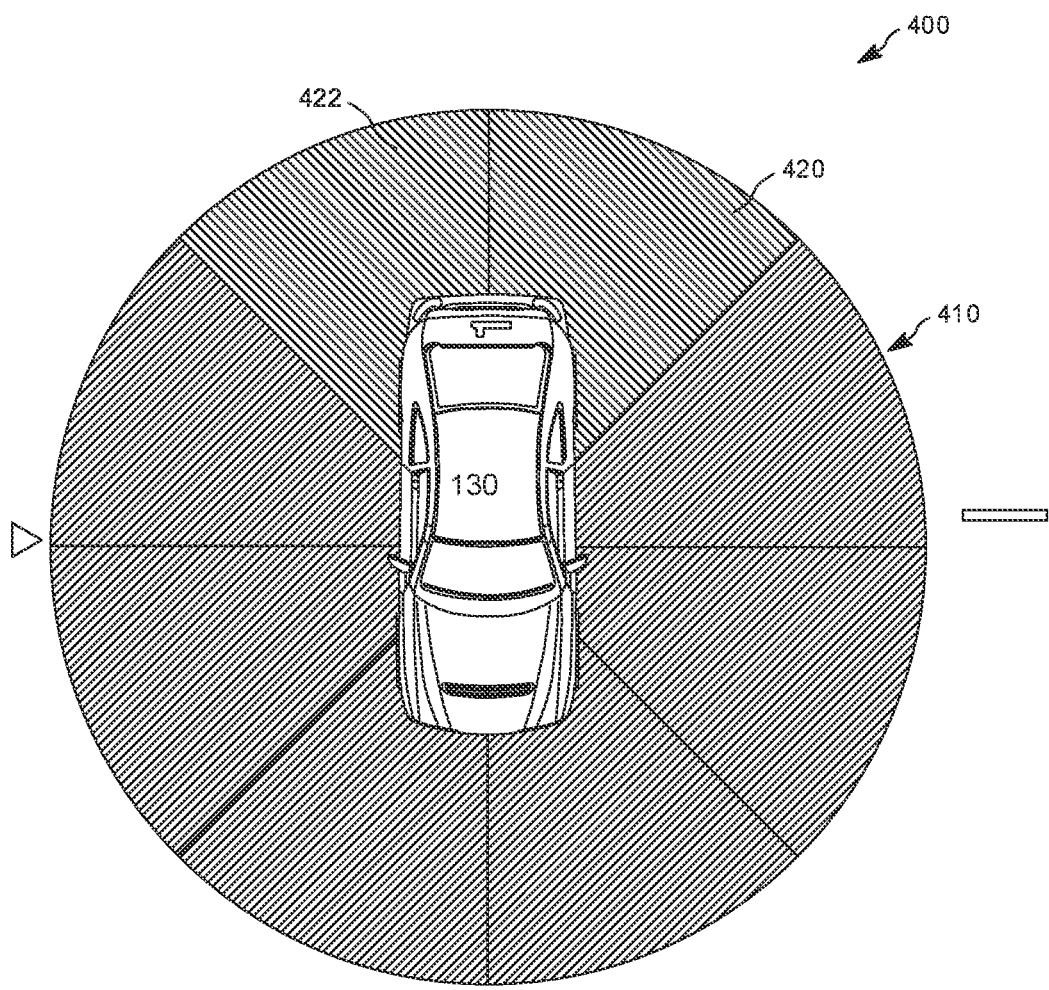
FIG. 4 illustrates an exemplary array of vehicle pose orientations surrounding a partially obstructed vehicle in accordance with an embodiment of the disclosure.

Referring to FIG. 4, in accordance with the disclosure, nomadic device 120 receives proximity data from vehicle 120 and calculates, by running an algorithm, for example, an algorithm that determines one or more positions around the vehicle with the least obstructions present and selects one or more advantageous static pose orientations. In accordance with one or more embodiments, an augmented reality system presents one or poses to a user of a nomadic device as an array 400 surrounding vehicle 130. In one or more embodiments, array 400 may include zones surrounding the vehicle 120 that indicate obstructed areas 410 and include zones 420, 422 that indicate possible locations where the user could engage the vehicle via augmented reality tracking.

Figure 5:
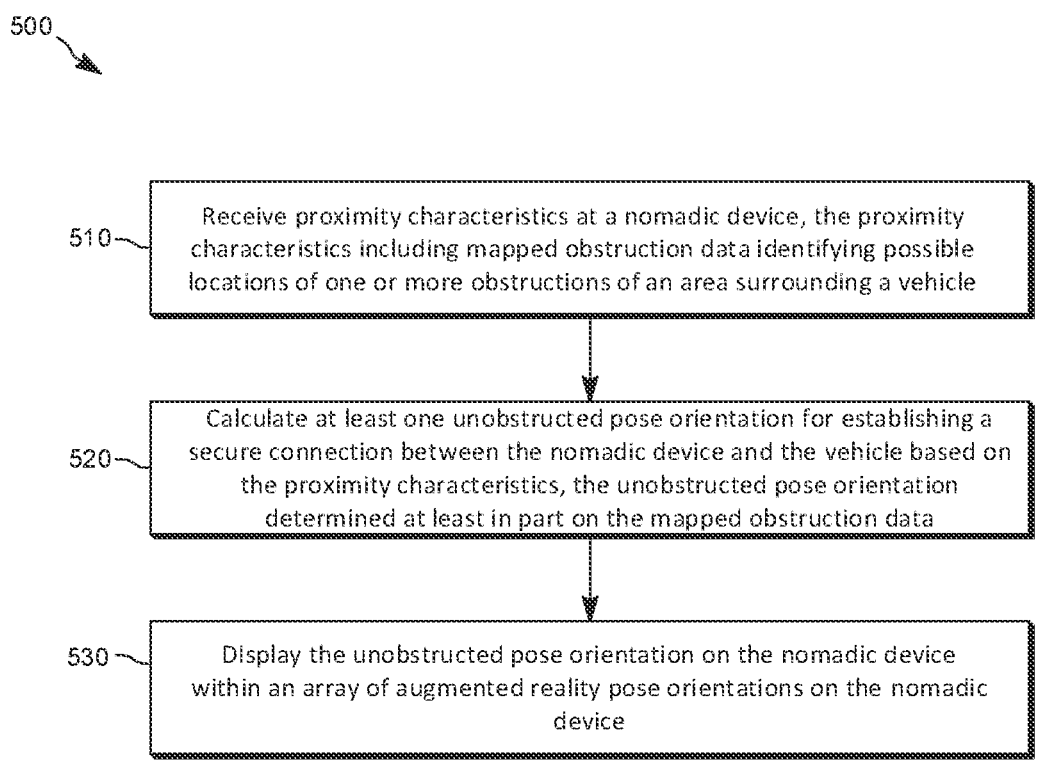
FIG. 5 illustrates a flow diagram of a method in accordance with an embodiment of the disclosure.

Referring to FIG. 5, a flow diagram illustrates a method in accordance with an embodiment of the disclosure. As shown, block 510 provides for receiving proximity characteristics at a nomadic device, the proximity characteristics including mapped obstruction data identifying possible locations of one or more obstructions of an area surrounding a vehicle. For example, the mapped obstruction data may include data received at nomadic device 120 from vehicle 130 identifying possible locations of one or more obstructions such as wall 310 and vehicles 320 and 330 shown in FIG. 3 surrounding vehicle 130. In one or more embodiments, the mapped obstruction data includes a 360 degree mapping of data based on vehicle 130 wireless communication nodes 150*a*, 150*b*, 150*c*, 150*d* and/or 150*e*. In one or more embodiments, prior to receiving proximity characteristics, a wireless protocol connection between the vehicle 130 and nomadic device 120 is first established. In one or more embodiments, vehicle sensor data may be transmitted directly to nomadic device 120 over a wireless Bluetooth® or WiFi or similar wireless protocol. In one or more embodiments, the vehicle sensor data is transmitted as a CAD file.

Block 520 provides for calculating at least one unobstructed pose orientation for establishing a secure connection between the nomadic device and the vehicle based on the proximity characteristics, the unobstructed pose orientation determined at least in part on the mapped obstruction data. For example, nomadic device 120 may receive mapped obstruction data from vehicle 130 to enable nomadic device 120 to perform calculations, such as running an algorithm to generate an array, such as array 400 shown in FIG. 4.

For example, in one or more embodiments, the array 400 is an array surrounding the vehicle based on the mapped obstruction data, and the calculating at least one unobstructed pose orientation may include identifying one or more unobstructed positions, such as 420, 422 within the array 400 surrounding the vehicle using the mapped obstruction data. In one or more embodiments, the identifying one or more unobstructed positions within the array surrounding the vehicle using the mapped obstruction data, includes sequentially correlating the defined array 400 surrounding the vehicle with the identified unobstructed positions within the array, and selecting a most likely to be unobstructed static pose orientation from the one or more or more unobstructed positions within the defined array. For example, of poses 420 and 422, the nomadic device may determine one of the poses is closer to the user of the nomadic device and select the closer pose.

Block 530 provides for displaying the unobstructed pose orientation on the nomadic device within an array of augmented reality pose orientations on the nomadic device. For example, after generating array 400, nomadic device 120 may display the array to a user to identify areas around vehicle 130 which are more accessible to a user of nomadic device 120 to enable a vehicle pose authentication to occur.

In one or more embodiments, the displaying the unobstructed pose orientation of block 530 includes displaying the unobstructed pose orientation as a visual augmented reality instruction to a user of the nomadic device 120, the instruction providing directions to the user. For example, in one embodiment, displaying the unobstructed pose orientation may include displaying the unobstructed pose orientation as an animated overlay in an augmented reality view on the nomadic device 120, the overlay including a surface model of the vehicle 130 and an icon that indicates where a user of the nomadic device 120 should be stand within the unobstructed pose orientation. In some examples, the nomadic device may be a headset with binocular vision and a camera that presents an augmented reality overlay to what is seen by a user of the nomadic device.

In one or more embodiments, the displaying the unobstructed pose orientation of block 330 includes establishing a level of engagement as a part of a vehicle self-parking operation. For example, a level of engagement could be a Level 2 automation level.

Figure 6:
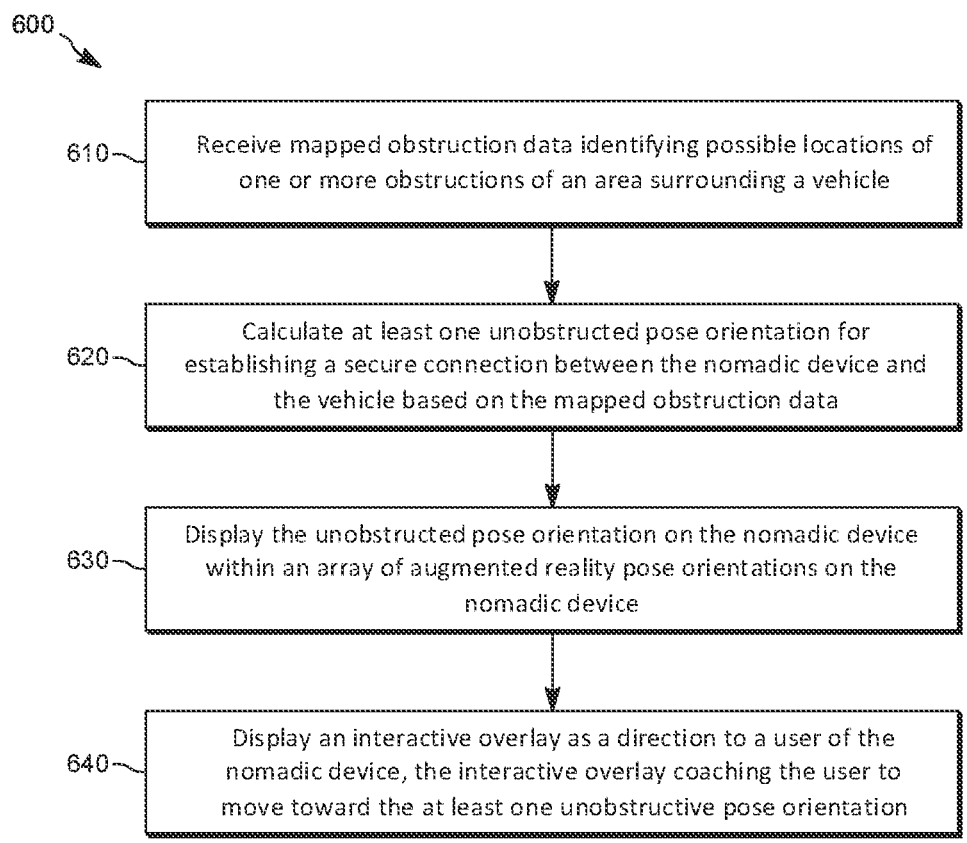
FIG. 6 illustrates a flow diagram of a method in accordance with an embodiment of the disclosure.

Referring now to FIG. 6, a flow diagram illustrates another method in accordance with one or more embodiments. As shown block 610 provides for receiving mapped obstruction data identifying possible locations of one or more obstructions of an area surrounding a vehicle. For example, nomadic device 120 may receive mapped obstruction data from vehicle 130.

Block 620 provides for calculating at least one unobstructed pose orientation for establishing a secure connection between the nomadic device and the vehicle based on the mapped obstruction data. For example, nomadic device 120 may perform an algorithm after receiving mapped obstruction data from vehicle 130 that determines at least one unobstructed pose orientation.

Block 630 provides for displaying the unobstructed pose orientation on the nomadic device within an array of augmented reality pose orientations on the nomadic device. For example, a display on nomadic device 120 can include augmented reality pose orientations in the form of an array surrounding vehicle 130.

Block 640 provides for displaying an interactive overlay as a direction to a user of the nomadic device, the interactive overlay coaching the user to move toward at least one unobstructive pose orientation. For example, in one or more embodiments, nomadic device 120 includes a display that includes an array and an interactive overlay that provides directions or instructions to a user, such as arrows or a map directing a user toward a most accessible pose location for authenticating the nomadic device 120 to vehicle 130.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 320, the memory 420, and the memory 520, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving proximity characteristics at a nomadic device, the proximity characteristics including mapped obstruction data identifying possible locations of one or more obstructions of an area surrounding a vehicle;
calculating at least one unobstructed pose orientation for establishing a secure connection between the nomadic device and the vehicle based on the proximity characteristics, the unobstructed pose orientation determined at least in part on the mapped obstruction data; and
displaying the unobstructed pose orientation on the nomadic device within an array of augmented reality pose orientations on the nomadic device, wherein the displaying the unobstructed pose orientation on the nomadic device within the array of augmented reality pose orientations on the nomadic device further comprises:
displaying the unobstructed pose orientation as an animated overlay in an augmented reality view on the nomadic device, the overlay including a surface model of the vehicle and an icon that indicates where a user of the nomadic device should be standing within the unobstructed pose orientation.

2. The method of claim 1, wherein the mapped obstruction data includes a 360 degree map of the area surrounding the vehicle.

3. The method of claim 1, wherein the receiving proximity characteristics at the nomadic device further comprises:
establishing a wireless protocol connection between the nomadic device and the vehicle to authenticate the nomadic device with the vehicle; and
receiving the proximity characteristics from the vehicle based on one or more wireless communication nodes on the vehicle.

4. The method of claim 3 wherein the receiving the proximity characteristics from the vehicle based on the one or more wireless communication nodes on the vehicle further comprises:
receiving a file from the vehicle including a 360 degree map of the area surrounding the vehicle, an indication of the one or more obstructions, if present, and an indication of a proximity of the one or more obstructions.

5. The method of claim 3 wherein the receiving the proximity characteristics from the vehicle based on the one or more wireless communication nodes on the vehicle further comprises:
receiving the proximity characteristics after the vehicle collects proximity sensor data from the one or more wireless communication nodes, one or more cameras, one or more emitters or from a cloud-based network.

6. The method of claim 3 wherein the receiving the proximity characteristics from the vehicle based on the one or more wireless communication nodes on the vehicle further comprises:
receiving the proximity characteristics from the vehicle as a computer-aided design (CAD) data file over the wireless protocol connection.

7. The method of claim 3 wherein the receiving the proximity characteristics from the vehicle based on the one or more wireless communication nodes on the vehicle is sent to the nomadic device from the vehicle.

8. The method of claim 1 wherein the calculating the at least one unobstructed pose orientation for establishing the connection between the nomadic device and the vehicle based on the proximity characteristics further comprises:
defining the array surrounding the vehicle based on the mapped obstruction data; and
identifying one or more unobstructed positions within the array surrounding the vehicle using the mapped obstruction data.

9. The method of claim 8 wherein the identifying one or more unobstructed positions within the array surrounding the vehicle using the mapped obstruction data, further comprises:
sequentially correlating the defined array surrounding the vehicle with the identified unobstructed positions within the array; and
selecting a most likely to be unobstructed static pose orientation from the one or more or more unobstructed positions within the defined array.

10. The method of claim 1 wherein the displaying the unobstructed pose orientation on the nomadic device within an array of augmented reality pose orientations on the nomadic device further comprises:
displaying the unobstructed pose orientation on the nomadic device as a visual augmented reality instruction to a user of the nomadic device, the instruction providing directions to the user.

11. The method of claim 1, wherein the displaying the unobstructed pose orientation on the nomadic device within an array of augmented reality pose orientations establishes a level of engagement as a part of a vehicle self-parking operation.

12. A method comprising:
receiving mapped obstruction data identifying possible locations of one or more obstructions of an area surrounding a vehicle;
calculating at least one unobstructed pose orientation for establishing a secure connection between the nomadic device and the vehicle based on the mapped obstruction data;
displaying the unobstructed pose orientation on the nomadic device within an array of augmented reality pose orientations on the nomadic device; and
displaying an interactive overlay as a direction to a user of the nomadic device, the interactive overlay coaching the user to move toward the at least one unobstructed pose orientation, wherein the displaying the unobstructed pose orientation on the nomadic device within an array of augmented reality pose orientations on the nomadic device, further comprises: defining the array surrounding the vehicle based on the mapped obstruction data; identifying one or more unobstructed positions within the array surrounding the vehicle using the mapped obstruction data; sequentially correlating the defined array surrounding the vehicle with the identified unobstructed positions within the array; and selecting a most likely to be unobstructed static pose orientation from the one or more or more unobstructed positions within the defined array.

13. The method of claim 12, wherein the mapped obstruction data identifying possible locations of the one or more obstructions of the area surrounding the vehicle further comprises:
establishing a wireless protocol connection between the nomadic device and the vehicle to authenticate the nomadic device with the vehicle; and
receiving a file from the vehicle including a 360 degree map of the area surrounding the vehicle, an indication of the one or more obstructions, if present, and an indication of a proximity of the one or more obstructions.

14. The method of claim 12 wherein the mapped obstruction data identifying possible locations of the one or more obstructions of the area surrounding the vehicle includes proximity sensor data collected by one or more wireless communication nodes.

15. The method of claim 12 wherein the displaying the interactive overlay as a direction to the user of the nomadic device, the interactive overlay coaching the user to move toward the at least one unobstructed pose orientation on the nomadic device further comprises:
displaying the unobstructed pose orientation as an animated overlay in an augmented reality view on the nomadic device, the overlay including a surface model of the vehicle and an icon of the user.

16. A system for a nomadic device comprising:
a memory that stores computer-executable instructions; and
a processor configured to access the memory and execute the computer-executable instructions to:
receive one or more proximity characteristics, the proximity characteristics including mapped obstruction data identifying possible locations of one or more obstructions of an area surrounding a vehicle;
calculate at least one unobstructed pose orientation for establishing a secure connection between the nomadic device and the vehicle based on the proximity characteristics, the unobstructed pose orientation determined at least in part on the mapped obstruction data; and
display the unobstructed pose orientation within an array of augmented reality pose orientations;
define the array surrounding the vehicle based on the mapped obstruction data;
identify one or more unobstructed positions within the array surrounding the vehicle using the mapped obstruction data by sequentially correlating the defined array surrounding the vehicle with the identified unobstructed positions within the array; and
display the unobstructed pose orientation as an animated overlay in an augmented reality view on the nomadic device, the overlay including a surface model of the vehicle and an icon that indicates where a user of the nomadic device should stand within the unobstructed pose orientation.

17. The system for a nomadic device of claim 16, wherein the processor configured to access the memory and execute the computer-executable instructions is further configured to receive a file from the vehicle including a 360 degree map of the area surrounding the vehicle, an indication of the one or more obstructions, if present, and an indication of a proximity of the one or more obstructions, the file including proximity sensor data collected by one or more wireless communication nodes.

* * * * *